Dec. 23, 1958   J. G. RUSSELL   2,865,392
REMOTE-SENSED FUEL TANK AIR CONTROL VALVE
Filed June 17, 1955   3 Sheets-Sheet 1
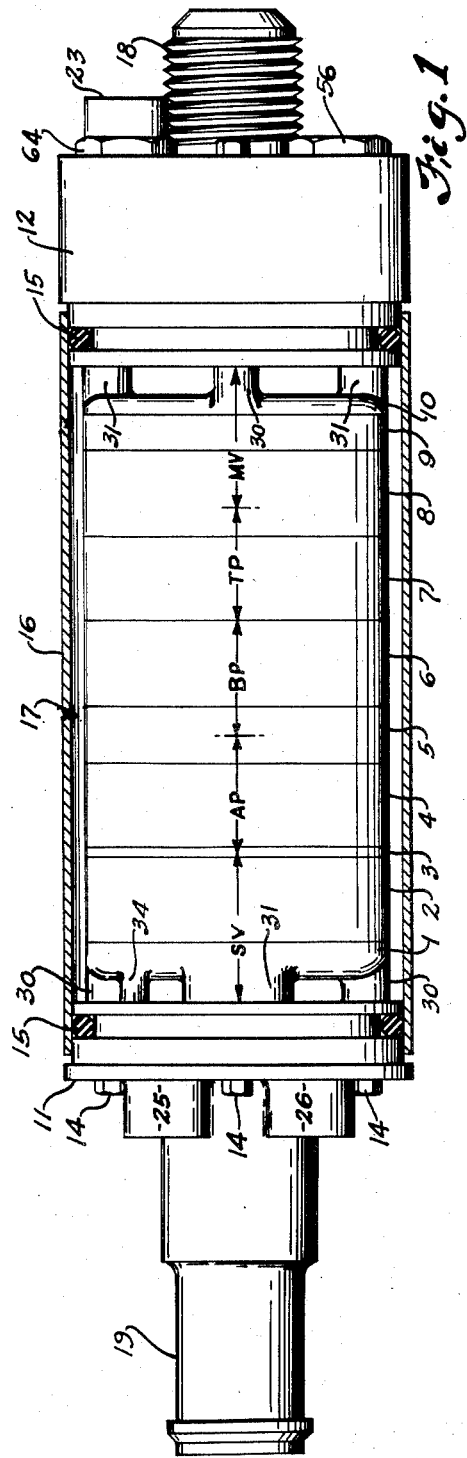
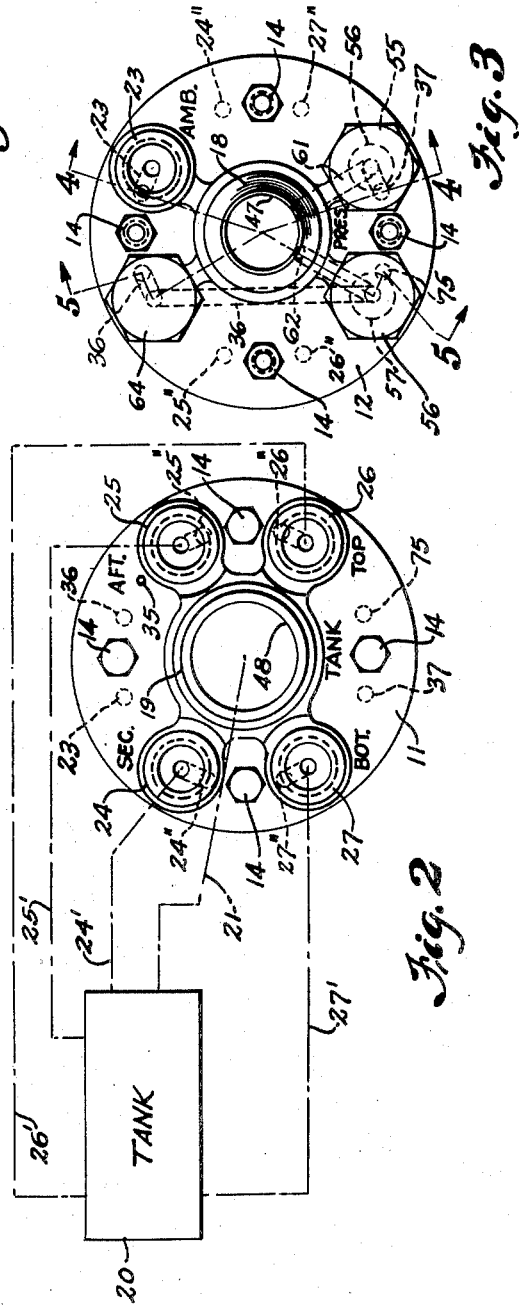
INVENTOR.
JOHN G. RUSSELL
BY
Oberlin & Limbach
ATTORNEYS

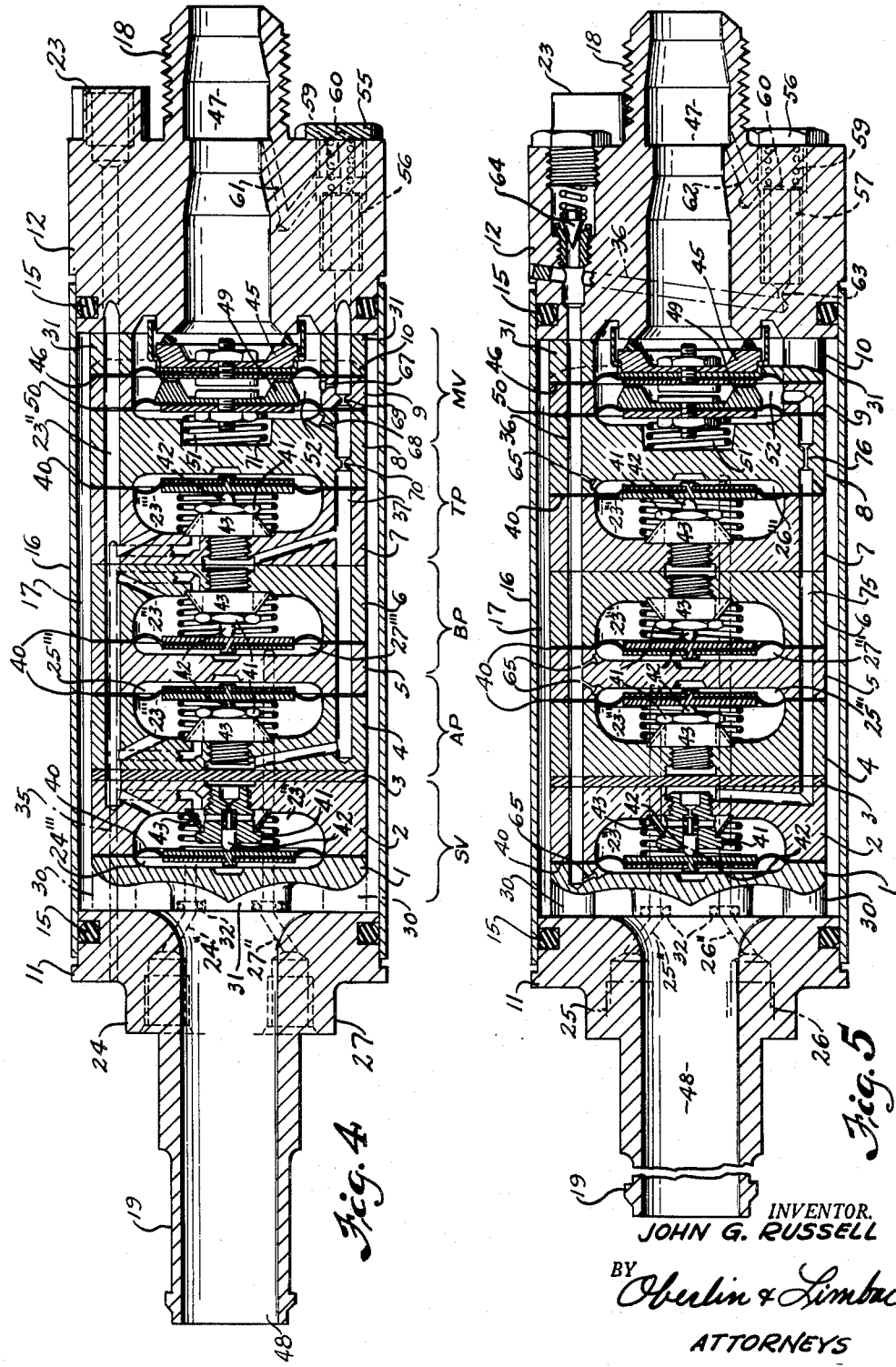

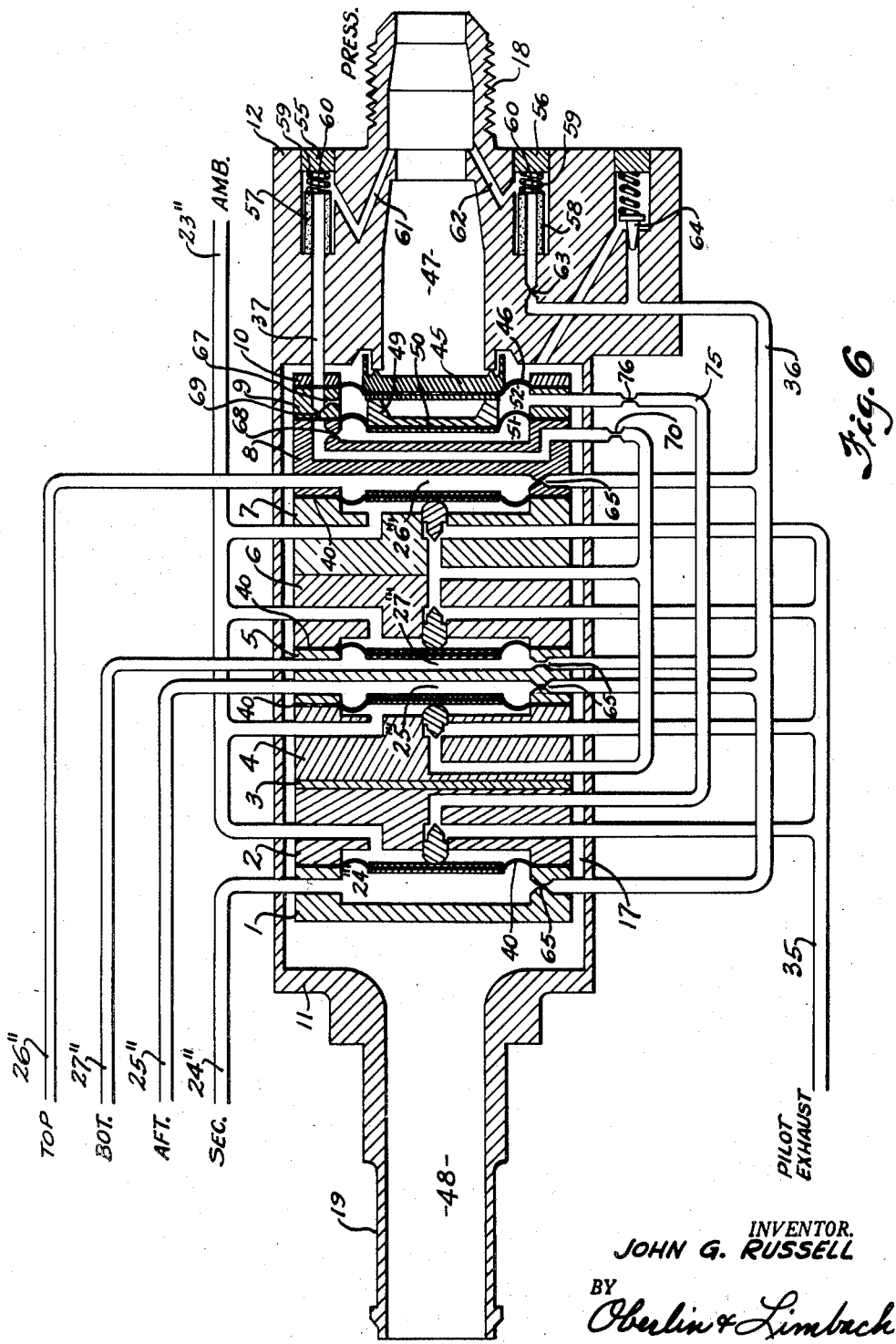

United States Patent Office 2,865,392
Patented Dec. 23, 1958

2,865,392

REMOTE-SENSED FUEL TANK AIR CONTROL VALVE

John G. Russell, Mayfield Heights, Ohio, assignor to Parker-Hannifin Corporation, Cleveland, Ohio, a corporation of Ohio Application June 17, 1955, Serial No. 516,121

17 Claims. (Cl. 137—206)

The present invention relates generally as indicated to a remote-sensed fuel tank air control valve, and more particularly to an air control valve assembly for use in connection with the maintenance of a predetermined air pressure in an aircraft fuel tank.

In aircraft fuel systems, it has been found desirable and necessary to maintain a positive air pressure on the fuel in the tank thereof so as to prevent excessive vaporization of the fuel in the tank at high altitudes and also to prevent collapse of the fuel tank under the influence of atmospheric pressure exteriorly of the tank and sub-atmospheric pressure interiorly of the tank, such collapsing being avoided by the maintenance of a predominating air pressure within the fuel tank.

However, the provision of a single air pressure sensing port in the tank with an air line leading to a pilot valve which, in turn, and in well known manner, controls the opening and closing of a main air supply valve having its outlet port connected to the tank, is not adequate for accurate control of air pressure within the tank, because, in different positions of flight of the airplane, the pressure to which said sensing port is subjected may include, in addition to the air pressure, the variable head of the fuel in the tank.

Accordingly, although the fluid pressure at the sensing port may be, say, ½ p. s. i., the actual air pressure may be less, zero, or even sub-atmospheric if, in the particular position of flight, the sensing port is below the fuel level in the tank.

On the other hand, the mere provision of several sensing ports at the top, bottom, and other points of the fuel tank with a corresponding number of separate pilot valves for opening and closing a main air supply valve renders the air pressure supply and control system unwieldy and bulky and unnecessarily heavy, and also entails a certain amount of duplication of pilot valve housing parts and of air lines leading from the respective pilot valves to the main air supply control valve.

In addition to the necessity of providing several pilot valves as aforesaid for the purpose of sensing the true air pressure in the tank regardless of the position of the airplane, it is additionally necessary as a safety feature to include a safety or secondary valve which will shut off the main air supply valve in the event that the pilot valves are inoperative to do so. Such safety valve adds to the complexity of the tank pressurizing system, since it too has a multi-part housing with a movable pilot valve member therein and an air line leading therefrom to the main valve control chamber.

With the foregoing in mind, it is one primary object of this invention to provide a unitary valve assembly wherein a plurality of pilot valves, a main air supply control valve, and a safety or secondary valve, are all disposed in juxtaposed or sandwiched relation and clamped together to form a lightweight and compact assembly which, in essence, is a substantially complete fluid system in and of itself, and requires only the connection of its several ports to the fuel tank and to an air pressure supply source, certain ones of the intervening, juxtaposed parts constituting housing parts for two successive valves or forming air chambers common to two successive valves.

It is another object of this invention to provide a valve assembly which has therein, as a part of the compact unitary assembly, a safety or secondary valve effective to prevent the rising of the air pressure in the fuel tank above a prescribed maximum pressure to thus eliminate the possibility of bursting of the tank.

It is another object of this invention to provide a unitary valve assembly of the character indicated wherein the main air supply passage is, in part, formed between the aforesaid juxtaposed, clamped assembly of pilot valves and an embracing tubular casing member.

It is another object of this invention to provide a unitary valve assembly of the character indicated wherein several pilot valves communicate with their respective tank sensing ports and with the air supply source through registering passages which extend from the ends of the valve assembly through one or more of the other pilot valve parts or through the end members between which the pilot valve parts are thus clamped in juxtaposed relation.

It is another object of this invention to provide a valve assembly of the character indicated which has an end-clamping member equipped with other appurtenances of an air pressure supply and control system such as a sensing supply relief valve and air filters.

It is another object of this invention to provide a valve assembly of the character indicated wherein the ambient chamber on one side of each of the diaphragm-type pilot valves is sub-divided so that puffs of air from the main valve control chamber (released or vented by the opening of the pilot valves) do not influence the ambient air pressure acting on such one side of the diaphragms.

It is still another object of this invention to provide a valve assembly of the character indicated wherein the main air supply control valve is of the double diaphragm type to insure proper operation thereof even though one diaphragm may be ruptured, and to achieve unique cooperative control of the main air supply valve by the secondary and the pilot valves.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

In said annexed drawings:

Fig. 1 is a side elevation view of a preferred embodiment of the present invention, the tubular casing member being sectioned to show the several valves inside as clamped in juxtaposed or sandwiched relation between the end members of the valve assembly;

Fig. 2 is an end elevation view as viewed from the left-hand end of Fig. 1, and showing in dot-dash lines the air lines leading from the valve assembly to a fuel tank;

Fig. 3 is an end elevation view as viewed from the right-hand end of Fig. 1;

Figs. 4 and 5 are longitudinal cross-section views taken substantially along the lines 4—4 and 5—5, Fig. 3, respectively; and Fig. 6 is a schematic diagram of the Figs. 1 to 5 valve assembly showing the several valve ports and passages.

Referring now more specifically to the drawings, and first to Figs. 1 to 3, a series of juxtaposed plates or discs 1 to 10 are clamped together between end members 11 and 12 as by means of four bolts and nuts 14. Surrounding the assembly of said plates 1 to 10, and making fluid-tight sealing engagement with the O rings 15 of the end members 11 and 12, is a tubular casing member 16 which forms with the juxtaposed assemblies of said plates an annular passage 17 for flow of air from the pressure supply port 18 (labeled "Pres") in end member 12 to the port 19 (labeled "Tank") in end member 11 communicating with the fuel tank 20 by way of an air line 21.

The end member 12 is also formed with an ambient port 23 (labeled "Amb") and the other end member 11 is formed with four ports 24, 25, 26, and 27, viz. secondary, aft, top, and bottom, labeled "Sec," "Aft," "Top," and "Bot" respectively, and which are connected to selected portions of the tank 20 by way of conduits which, for convenience, have been assigned the same reference numerals as the ports followed by the prime symbol ('), thus 24', 25', 26', and 27'.

It is to be noted that, by reason of the specific locations of the aft, top, and bottom sensing ports 25, 26, and 27 on the tank 20 to which air lines 25', 26' and 27' are connected, at least one of these three sensing ports will be subjected to air pressure only, regardless of the position of the tank 20.

In normal level flight of the airplane, both or either one of the aft and top sensing ports 25 and 26 of the tank will be above the fuel level in the tank; but when the airplane is flying upside-down or in a tilted position (banking, climbing, or descending), there will be, in addition to the tank air pressure acting on said aft and top sensing ports, an additional pressure depending on the head of the fuel. In that event, the bottom sensing port 27 of the tank will be above the fuel level, whereby only the air pressure acts on said bottom sensing port. The tank ports are thus disposed so that at least one of the three ports 25, 26, or 27 will be above the fuel level so that only air pressure will be sensed thereby.

As before mentioned, there are a plurality of plates 1 to 10 which are clamped together in juxtaposed relation between the end members 11 and 12.

The first plate 1 at the lefthand side as viewed in Figs. 1, 4, 5, and 6 is formed with two circular bosses 30 at the top and bottom through which two of the four bolts 14 extend. Said plate 1 is also formed with two other bosses 31 at the front and back, both of generally kidney-shaped cross-section and provided with center holes for the other two bolts 14 and with passages 24" and 27" which respectively communicate with the "Sec" and "Bot" ports 24 and 27 shown in dotted lines in Fig. 4 and with passages 25" and 26" which respectively communicate with the "Aft" and "Top" ports 25 and 26 as shown in dot-dash lines in Fig. 5. These kidney-shaped bosses 31 surrounding the passages 24", 27" and 25", 26" are provided with recesses for accommodating O rings or equivalent sealing rings 32 which form fluid-tight seals between said bosses and the juxtaposed end face of the end member 11.

Plate 1 also has another boss 34 (Fig. 1) to accommodate a vent or pilot exhaust passage 35 (Figs. 2, 4, and 6) extending longitudinally through end member 11 and plates 1 to 6 and terminating in plate 7.

The plate 10 at the other end of the assembly, that is, at the righthand end as viewed in Figs. 1, 4, 5, and 6, is of generally the same construction as the plate 1 just described, except that the round bosses 30 for two of the bolts 14 are at the front and rear, whereas the kidney-shaped bosses 31 are at the top and bottom, the top one being provided with three holes for one bolt 14 and for two passages, viz. ambient passage 23" and sensing supply passage 36, and the bottom one being provided with two holes for another bolt 14 and for balancing air pressure supply passage 37.

The clamped assembly of juxtaposed plates 1 to 10 provides casings for a secondary pilot valve, for three pilot valves, and for a main air supply control valve, and for convenience (see Figs. 1 and 4) the secondary valve is herein designated "SV," the pilot valves in communication with the "Aft" port 25, the "Bot" port 27, and the "Top" port 26 are designated "AP" (aft pilot), "BP" (bottom pilot), and "TP" (top pilot) respectively, and the main air supply control valve is designated "MV" (main valve).

Inasmuch as the secondary valve SV and pilot valve AP, BP, and TP constructions are identical, like reference numerals have been used to designate like parts thereof.

However, before describing the valves SV, AP, BP, TP, and MV in detail, it is believed appropriate at this time to state that the valves SV, AP, BP, and TP are diaphragm-type pilot valves wherein each has a valve chamber subdivided by a diaphragm into a vented "ambient" chamber and a control chamber communicating with the respective tank sensing ports, and a pilot valve member actuated by its associated diaphragm to seated position whenever the pressure on the control chamber side of the diaphragm exceeds the ambient pressure and spring pressure acting on the opposite side of the diaphragm and on the pilot valve member and to unseated position whenever the ambient and spring pressures exceed the control chamber pressure.

The valve MV is also preferably of the diaphragm type having a movable valve member carried by a diaphragm and held in seated position to close the main air supply line by air supply pressure acting on the rear, control chamber side of said diaphragm which is of larger effective area than the front, valve member side. Said valve member is urged to unseated position by the air supply pressure whenever the control chamber pressure is vented faster through a pilot valve than it can be built up through a control orifice leading from the air pressure supply line to the control chamber.

Referring now in detail to the valves SV, AP, BP, and TP, each comprises a flexible diaphragm 40 having its central portion clamped between riveted-together washers and having its outer portion clamped between adjacent plates, namely, 1—2, 4—5, 5—6, and 7—8, respectively.

Screwed into the central openings of the respective plates 2, 4, 6, and 7 are pilot valve bodies 41 each provided with an opening which is adapted to be opened and closed by means of a movable pilot valve member 42, the latter being slidably fitted in the body and spring-pressed toward passage-opening position and into engagement with the central portion of the associated diaphragm 40.

Disposed between the heads of the threaded-in valve bodies 41 and the associated plates are frusto-conical washers 43 which define pilot valve outlet chambers communicated by way of radially extending passages with the vent passage 35 (see Fig. 4).

As is best shown in Figs. 4 and 6, the ambient port 23 at the end of the end member 12 leads to the longitudinally extending ambient passage 23" defined by registering drilled holes in the plates 2 to 10, and, as shown, plates 2, 4, 6, and 7 are formed with radially inwardly extending passages which lead into the ambient-spring chambers 23"' on the pilot valve member side of the diaphragms 40. Accordingly, the pilot valve members 42 will be in unseated position whenever the spring pressure thereon and on the diaphragms exceeds the air pressures in the sensing port chambers 24"', 25"', 27"', and 26"' on the opposite side of said diaphragms 40 to which the respective passages 24", 25", 27", and 26" lead; and, vice versa, the pilot valve members 42 will be urged to seated position whenever the forces exerted by air pressure in the sensing port chambers exceeds the opposing forces exerted by the springs.

The sensing port chambers 24''', 25''', 27''' and 26''' for valves SV, AP, BP, and TP communicate respectively with the secondary, aft, bottom, and top ports 24, 25, 27, and 26 of the end member 11 by way of the passages 24'', 25'', 27'', and 26'' which extend longitudinally through one or more of the plates and terminate in radially inwardly extending passages leading into the respective sensing port chambers.

The pilot valves AP, BP, and TP are preferably arranged so that an air pressure of ½ p. s. i. or greater in the sensing port chambers will urge the diaphragms 40 toward their associated pilot valve members 42 to hold the latter in seated position.

However, should the air pressure at any one of the three sensing ports of the tank 20 be less than ½ p. s. i., the spring pressures in the ambient chambers 23''' of the corresponding valves will cause the diaphragms 40 to move in a direction permitting the associated pilot valve members 42 to move to unseated position so as to open the main air supply control valve MV in a manner presently to be described.

Essentially, the only difference between valve SV and the pilot valves AP, BP, and TP is in the magnitude of the spring pressure exerted against the ambient chamber side of the diaphragm 40 being such that a 3 p. s. i. or greater pressure in the opposite chamber 24''' is required to effect a closing of pilot valve member 42. Therefore, under normal operating conditions, the valve SV will remain open while the valve MV will be opened responsive to opening of any of the pilot valves AP, BP, and TP and will be closed when all of said pilot valves are closed.

The main air supply control valve MV includes a movable valve member 45 carried by the central portion of a flexible diaphragm 46 having its outer portion clamped between the plates 9 and 10, said valve member cooperating with a seat surrounding the main air supply passage 47, the port 18 thereof being communicated with a source of air pressure which may be of any desired magnitude but usually somewhere between 25 and 200 p. s. i.

As is evident, when the valve member 45 is moved toward the left as viewed in Figs. 4 and 5, air may flow through the passage 47 outwardly between the bosses 30 and 31 of the end plate 10, through the annular space 17 between the plate assembly and the tubular casing 16, radially inward between the bosses 30, 31, and 34 of the other end plate 1, and into the fuel tank 20 by way of the passage 48 in tank port 19 and conduit 21.

Behind the aforesaid valve member-diaphragm assembly 45—46 is a valve-engaging member-diaphragm assembly 49—50 clamped between plates 8 and 9, and forming a chamber 51 behind the diaphragm 50 and a chamber 52 between the diaphragms 46 and 50.

The end member 12 is formed with two recesses which are closed by plugs 55 and 56 threaded thereinto and in which recesses are disposed tubular filters 57 and 58 made as of sintered bronze, for example, to filter out dust or other foreign matter from the primary and sensing supply air used in the control and operation of the several valves herein.

Each filter 57 and 58 is held in place as by means of a spring 59 which presses an imperforate washer 60 against one end thereof. Leading into one end of the filter chamber from the air supply passage 47 are passageways 61 and 62, the air thus entering the filter chambers flowing around the outside of the respective filters 57 and 58 and through the walls thereof to the respective pasages 37 and 36 at the other end of the filter.

One filter outlet 63 is in the form of a small orifice which communicates a portion of passage 36 which extends across end member 12. A spring-actuated pressure relief valve 64 in passage 36 beyond orifice 63 has its outlet chamber vented to the passage 17 and is arranged to prevent the pressure in the passage 36 from building up above a predetermined maximum such as 12 p. s. i., for example.

The passage 36 is the sensing air supply passage and, as best shown in Figs. 5 and 6, the plates 2, 5, and 8 are formed with orifices 65 for conducting sensing supply air from passage 36 into the respective sensing port chambers 24''', 25''', 27''', and 26''' of the valves SV, AP, BP, and TP.

As before mentioned, should the pilot valves AP, BP, and TP be inoperative to close the main control valve MV, the valve SV will do so if the air pressure in the tank 20 continues to build up to a pressure of 3 p. s. i. or greater.

The orifices 65 leading to the sensing port chambers of the pilot valves AP, BP, and TP permit continued flow of air through the respective aft, bottom, and top ports into the tank 20, and when the pressure in said chambers and at all of the tank sensing ports is ½ p. s. i. or more, all of said pilot valves will be in a seated position by reason of the predominance of the diaphragm-moving force in said sensing port chambers over the opposing spring pressure.

The other filtered air passage 37 is formed with a first orifice 67 leading into the chamber 52 between the two diaphragms 46 and 50 of the main control valve MV.

The aforesaid passage 37 is provided with a second orifice 68 leading into the chamber 51 behind the diaphragm 50 and with two other orifices 69 and 70 respectively disposed in between said two orifices 67 and 68 and beyond the second orifice 68. After the last-mentioned orifice, the passage continues longitudinally through several of the plates with radially inwardly extending branches leading to the inlet sides of the pilot valves AP, BB, and TP.

From the foregoing, it can be seen that, if the air pressure in the inlet side of any one of the three pilot valves AP, BP, or TP is released to the atmosphere (by way of passage 35) by the opening of the associated pilot valve member 42, the pressure will drop in the chambers 51 and 52 of the main air control supply valve MV, with the result that the higher air pressure, viz. 25–200 p. s. i., acting on the main control valve member 45 will cause the latter to move toward the left as viewed in Figs. 4 and 5 in opposition to the force exerted by main valve spring 71 and the reduced pressure, whereby air will flow from the inlet passage 47 through the annular space 17 between the tubular casing member 16 and the juxtaposed assembly of plates 1 to 10 and thence out through the tank port passage 48 to the fuel tank 20.

The provision of a double diaphragm type of main air supply control valve MV insures proper operation thereof even though one of the diaphragms 46 or 50 may become ruptured. Accordingly, if the first diaphragm 46 is ruptured, the dropping of the air pressure in the then remaining chamber 51 will permit the main valve member 45 to be opened by the main air line pressure. When said first diaphragm 46 is ruptured, a certain small amount of air will continuously flow into the tank 20 through the orifice 67 and through the ruptured diaphragm 46.

On the other hand, if the second diaphragm 50 is ruptured, then, in effect, the two chambers 51 and 52 are really one, and therefore the venting of this one chamber will permit the main pressure supply to urge the main control valve member 45 away from its seat.

By the same token, air pressure of magnitude substantially equal to that in the supply passage 47 in the chamber 51 when the first diaphragm 46 is ruptured or in the combined chamber 51—52 when the second diaphragm 50 is ruptured, will, together with spring 71, overbalance to hold the main control valve 45 against its seat until such time as the pressure in said chamber 51 or 51—52, as the case may be, is reduced to a value sufficiently low to enable the main air supply pressure to unseat said main control valve member 45.

With respect to the secondary valve SV control of the main valve MV, the chamber 52 between the two diaphragms 46 and 50 of the main control valve MV has a radially extending passage joined to a longitudinally extending passage 75 provided with an orifice 76, said passage terminating in a radially inwardly extending passage leading to the inlet side of SV.

As evident, the chamber 23''' on one side of the diaphargm 40 is vented through the ambient port 23, and likewise the pilot valve outlet port is vented directly to the atmosphere by way of passage 35, the puff of air through the open pilot valve member being exhausted or vented independently so that it will not change the ambient pressure in the chamber 23''' proper.

The chamber 24 on the other side of SV diaphragm 40 communicates by way of the passage 24'' with the "Sec" port 24 which, in turn, is communicated with the tank 20 by way of the line 24'. This valve SV is normally open, but the air flow therethrough is ineffective by itself to open the main air control valve member 45 when all of the pilot valves AP, BP, and TP are closed, because at that time the air supply pressure is acting in the chamber 51 whereby the valve-engaging member 49 holds the valve member 45 against its seat. However, the release of pressure in said chamber 51 by any of the pilot valves will permit the main control valve member 45 to be forced away from its seat.

Now, in the event that the pilot valves AP, BP, and TP remain open and that, as a consequence, the main control valve 45 remains open even though the air pressure in the tank 20 is at the desired value of say ½ p. s. i., the pressure will build up only to a prescribed value in the tank as determined by the secondary valve SV, and in this particular example, when such air pressure in the tank builds up to 3 p. s. i., this pressure acting on the diaphragm 40 of SV will overbalance the ambient pressure and spring pressure to force said diaphragm and the pilot valve member 42 to seated position, whereupon the pressure in the chamber 52 between the diaphragm 46 and 50 can build up to substantially line pressure so as to close the main control valve MV.

Referring now to the operation of the valve assembly as a whole, the "Pres" port 18 is connected to an air pressure supply line at any desired pressure, say between 25 and 200 p. s. i., and the "Tank, Sec, Aft, Top, and Bot" ports 19, 24, 25, 26, and 27 at the other end of the valve assembly will be connected to the fuel tank 20 as is best shown in Fig. 2.

Assuming now that the airplane is in flight with the tank 20 in level position, and that each of the pilot valves AP, BP, and TP is set for ½ p. s. i., then when the air pressure in the tank at the "Aft" and "Top" sensing ports 25 and 26 is ½ p. s. i., the pressure at the "Bot" sensing port 27 will be ½ p. s. i. plus the pressure due to the head of the fuel in tank 20. In this condition of the fuel tank, all three pilot valves AP, BP, and TP will be in closed position.

In the particular example, the sensing supply relief valve 64 will be set for a pressure of 12 p. s. i. so that the maximum pressure in the sensing supply passage 36 will be no greater than this amount, and then, by reason of the orifices 65 leading into the sensing port chambers of the pilot valves AP, BP, and TP and to the sensing port chamber of the valve SV, there will be a continuous small amount of air flow from all of the ports Sec, Aft, Top, and Bot into the tank, which air flow preferably is not sufficient by itself to maintain the desired ½ p. s. i. air pressure in the tank 20.

As soon as the air pressure at any of the sensing ports 25, 26, and 27 drops to a value less than ½ p. s. i., the spring pressures of the associated pilot valve or pilot valves will move the diaphragms 40 in a direction permitting pilot valve members 42 to vent the passage 37 and chamber 51 of MV faster than it can be built up through orifice 69. The pressure differential thus created results in unseating of the main control valve member 45 to admit air into the tank 20 until the air pressure in the tank builds up to at least ½ p. s. i. for effecting closing of the open pilot valve or pilot valves.

The foregoing operation is effected in all positions of flight of the airplane. As evident from Fig. 2, if the tank 20 is positioned so that the righthand end thereof is at the bottom, the "Bot" and "Top" sensing ports 27 and 26 will be subjected solely to air pressure without head of fuel in addition thereto.

Likewise, if the lefthand end of the tank 20 is at the bottom, the "Aft" sensing port 25 will be above the fuel level so as to sense only the air pressure in the tank. Similarly, if the top of the tank 20 is at the bottom, the "Bot" sensing port 27 will be above the fuel level so as to sense only the air pressure in the tank.

Accordingly, in any position of the tank, at least one of the sensing ports is above the fuel level so that it is possible to maintain accurately the desired air pressure in the tank.

Other modes of applying the principle of the invention may be employed, change being made as regards the details described, provided the features stated in any of the following claims, or the equivalent of such, be employed.

I therefore particularly point out and distinctly claim as my invention:

1. In a valve assembly of the character wherein flow of fluid therethrough is controlled by a main valve member which is seated and unseated in accordance with the magnitude of fluid pressure in a chamber therebehind relative to the fluid pressure thereahead, and which, in turn, is controlled by a pilot valve member which is seated by predetermined fluid pressure in a chamber therebehind and unseated by reduction of such fluid pressure therebehind to respectively prevent escape of fluid pressure from the main valve chamber and to vent the main valve chamber, the combination of a valve casing provided with an inlet port adapted to be connected to a fluid pressure source, and an outlet port adapted to be connected to a unit to be supplied with fluid under pressure; and a series of juxtaposed main and pilot valve housing members clamped together to said casing and forming a vent passage adapted to be communicated with said main valve chamber when said pilot valve member is unseated, supply passages communicating said inlet port with said main and pilot valve chambers, and a sensing passage adapted to communicate said pilot valve chamber with fluid under pressure supplied to such unit.

2. In a valve assembly designed to maintain a predetermined air pressure in a liquid-containing tank having a plurality of air supply ports so located that at least one port will be disposed above the liquid level in all positions of the tank, the combination of a valve casing provided with an inlet port adapted to be connected to an air pressure source, an outlet port adapted to be connected to the tank to supply air under pressure thereinto, and a plurality of sensing ports adapted to be connected to the respective tank ports; a main valve member movable in said casing to permit and to block flow of air from said inlet port to said outlet port; and a plurality of pilot valve members in said casing respectively actuated by air pressure in said sensing ports being above and below a predetermined value to close and to open said main valve member; said valve casing comprising a series of clamped-together, juxtaposed main valve and pilot valve housing members which define an air pressure chamber behind said main valve member and behind each pilot valve member, passages leading from the pilot valve chambers to the respective sensing ports, a passage leading from said inlet port to the main valve chamber, and a vent passage which vents the main valve chamber whenever the air pressure in any or all pilot valve chambers drops below such predetermined value.

3. In a valve assembly designed to maintain a predetermined air pressure in a liquid-containing tank having a plurality of air supply ports so located that at least one port will be disposed above the liquid level in all positions of the tank, the combination of a valve casing provided with an inlet port adapted to be connected to an air pressure source, an outlet port adapted to be connected to the tank to supply air under pressure thereinto, and a plurality of sensing ports adapted to be connected to the respective tank ports; a main valve member movable in said casing to permit and to block flow of air from said inlet port to said outlet port; and a plurality of pilot valve members in said casing respectively actuated by air pressure in said sensing ports being above and below a predetermined value to close and to open said main valve member; said valve casing comprising a series of clamped-together, juxtaposed main valve and pilot valve housing members which define an air pressure chamber behind said main valve member and behind each pilot valve member, passages leading from the pilot valve chambers to the respective sensing ports, a passage leading from said inlet port to the main valve chamber, and a vent passage which vents the main valve chamber whenever the air pressure in any or all pilot valve chambers drops below such predetermined value, and a tubular member surrounding said housing members and forming therewith a passage for air flow from said inlet port to said outlet port.

4. In a valve assembly designed to maintain a predetermined air pressure in a liquid-containing tank having a plurality of air supply ports so located that at least one port will be disposed above the liquid level in all positions of the tank, the combination of a valve casing provided with an inlet port adapted to be connected to an air pressure source, an outlet port adapted to be connected to the tank to supply air under pressure thereinto, and a plurality of sensing ports adapted to be connected to the respective tank ports; a main valve member movable in said casing to permit and to block flow of air from said inlet port to said outlet port; and a plurality of pilot valve members in said casing respectively actuated by air pressure in said sensing ports being above and below a predetermined value to close and to open said main valve member; said valve casing comprising a series of clamped-together, juxtaposed main valve and pilot valve housing members which define an air pressure chamber behind said main valve member and behind each pilot valve member, passages leading from the pilot valve chambers to the respective sensing ports, a passage leading from said inlet port to the main valve chamber, and a vent passage which vents the main valve chamber whenever the air pressure in any or all pilot valve chambers drops below such predetermined value; said casing and said housing members being formed with orificed passages leading from said inlet port to the respective pilot valve chambers to maintain continuous air circulation at reduced pressure through said pilot valve chambers and said sensing ports into the tank.

5. In a valve assembly designed to maintain a predetermined air pressure in a liquid-containing tank having a plurality of air supply ports so located that at least one port will be disposed above the liquid level in all positions of the tank, the combination of a valve casing provided with an inlet port adapted to be connected to an air pressure source, an outlet port adapted to be connected to the tank to supply air under pressure thereinto, and a plurality of sensing ports adapted to be connected to the respective tank ports; a main valve member movable in said casing to permit and to block flow of air from said inlet port to said outlet port; and a plurality of pilot valve members in said casing respectively actuated by air pressure in said sensing ports being above and below a predetermined value to close and to open said main valve member; said valve casing comprising a series of clamped-together, juxtaposed main valve and pilot valve housing members which define an air pressure chamber behind said main valve member and behind each pilot valve member, passages leading from the pilot valve chambers to the respective sensing ports, a passage leading from said inlet port to the main valve chamber, and a vent passage which vents the main valve chamber whenever the air pressure in any or all pilot valve chambers drops below such predetermined value; each pilot valve member having a vented chamber on the opposite side from the associated pilot valve chamber, and means subdividing said vented chambers so that air pressure vented from said main valve chamber is ineffective to vary the pressure in said vented chambers.

6. In a valve assembly designed to maintain a predetermined air pressure in a liquid-containing tank having a plurality of air supply ports so located that at least one port will be disposed above the liquid level in all positions of the tank, the combination of a valve casing provided with an inlet port adapted to be connected to an air pressure source, an outlet port adapted to be connected to the tank to supply air under pressure thereinto, and a plurality of sensing ports adapted to be connected to the respective tank ports; a main valve member movable in said casing to permit and to block flow of air from said inlet port to said outlet port; and a plurality of pilot valve members in said casing respectively actuated by air pressure in said sensing ports being above and below a predetermined value to close and to open said main valve member; said valve casing comprising a series of clamped-together, juxtaposed main valve and pilot valve housing members which define an air pressure chamber behind said main valve member and behind each pilot valve member, passages leading from the pilot valve chambers to the respective sensing ports, a passage leading from said inlet port to the main valve chamber, and a vent passage which vents the main valve chamber whenever the air pressure in any or all pilot valve chambers drops below such predetermined value, and end members respectively formed with said inlet and outlet ports and between which said housing members are clamped in juxtaposed relation.

7. In a valve assembly designed to maintain a predetermined air pressure in a liquid-containing tank having a plurality of air supply ports so located that at least one port will be disposed above the liquid level in all positions of the tank, the combination of a valve casing provided with an inlet port adapted to be connected to an air pressure source, an outlet port adapted to be connected to the tank to supply air under pressure thereinto, and a plurality of sensing ports adapted to be connected to the respective tank ports; a main valve member movable in said casing to permit and to block flow of air from said inlet port to said outlet port; and a plurality of pilot valve members and a secondary valve member in said casing respectively actuated by air pressure in said sensing ports being above and below predetermined values to close and to open said main valve member; said valve casing comprising a series of clamped-together, juxtaposed main valve, pilot valve, and secondary valve housing members which define air chambers behind the respective valve members, passages leading from the pilot and secondary valve chambers to the respective sensing ports, a passage leading from said inlet port to the main valve chamber, and a vent passage which vents the main valve chamber whenever the air pressure in any or all pilot valve chambers and in said secondary valve chamber is below a predetermined value; said secondary valve member being set to close the main valve chamber venting at a higher pressure in said secondary valve chamber than in said pilot valve chambers to effect closing of said main valve member in the event that none of said pilot valve members is effective to do so.

8. In a valve assembly of the character wherein flow of fluid therethrough from an inlet port to an outlet port is controlled by a main valve member which is seated and unseated in accordance with the magnitude of fluid pressure in a chamber therebehind relative to fluid pressure thereahead in said inlet port, and which, in turn, is controlled by a pilot valve member which is seated by predetermined fluid pressure in a chamber therebehind and unseated by reduction of such fluid pressure therebehind to respectively prevent escape of fluid pressure from the main valve chamber and to vent the main valve chamber, the combination of a valve casing providing such inlet and outlet ports and such pilot valve and main valve chambers with passages leading from such inlet port to such main valve chamber and from the latter to a vent via said pilot valve member, a diaphragm-type main valve member, and a diaphragm-type main valve actuating member subdividing said main valve chamber into chamber portions between said main valve member and said actuating member and behind the latter which are adapted to be vented via such pilot valve member.

9. A valve assembly comprising end members respectively providing an inlet port and an outlet port, juxtaposed main valve and pilot valve housing members clamped between said end members, successively arranged main valve and pilot valve members movably carried by said housing members and forming therewith a main valve chamber and a pilot valve chamber behind the respective main valve and pilot valve members, said end and housing members being formed with registering passages communicating said inlet port with said main valve chamber, communicating said main valve chamber with a vent via said pilot valve member, and communicating said pilot valve chamber, with a port adapted to be connected to a unit to which fluid under pressure is to be supplied through said valve assembly, said pilot valve member being moved to a position venting said main valve chamber upon reduction of fluid pressure in said pilot valve chamber below a predetermined value whereby said main valve member is moved to a position opening communication between said inlet and outlet ports under the predominating influence of the fluid under pressure in said inlet port as compared with that in the then vented main valve chamber.

10. A valve assembly comprising end members respectively providing an inlet port and an outlet port, juxtaposed main valve and pilot valve housing members clamped between said end members, successively arranged main valve and pilot valve members movably carried by said housing members and forming therewith a main valve chamber and a pilot valve chamber behind the respective main valve and pilot valve members, said end and housing members being formed with registering passages communicating said inlet port with said main valve chamber, communicating said main valve chamber with a vent via said pilot valve member, and communicating said pilot valve chamber, with a port adapted to be connected to a unit to which fluid under pressure is to be supplied through said valve assembly, said pilot valve member being moved to a position venting said main valve chamber upon reduction of fluid pressure in said pilot valve chamber below a predetermined value whereby said main valve member is moved to a position opening communication between said inlet and outlet ports under the predominating influence of the fluid under pressure in said inlet port as compared with that in the then vented main valve chamber, and a tubular casing member extending between said end members and surrounding said housing members to form therewith a passage through which fluid is adapted to flow from said inlet port to said outlet port when said main valve member is moved to the position aforesaid.

11. A valve assembly comprising end members respectively providing an inlet port and an outlet port, juxtaposed main valve and pilot valve housing members clamped between said end members, successively arranged main valve and pilot valve members movably carried by said housing members and forming therewith a main valve chamber and a pilot valve chamber behind the respective main valve and pilot valve members, said end and housing members being formed with registering passages communicating said inlet port with said main valve chamber, communicating said main valve chamber with a vent via said pilot valve member, and communicating said pilot valve chamber, with a port adapted to be connected to a unit to which fluid under pressure is to be supplied through said valve assembly, said pilot valve member being moved to a position venting said main valve chamber upon reduction of fluid pressure in said pilot valve chamber below a predetermined value whereby said main valve member is moved to a position opening communication between said inlet and outlet ports under the predominating influence of the fluid under pressure in said inlet port as compared with that in the then vented main valve chamber, said housing members additionally forming a vented pilot valve chamber in front of said pilot valve member, and means subdividing said vented chamber to provide a separate vented chamber portion through which said main valve chamber is adapted to be vented by said pilot valve member.

12. A valve assembly comprising end members respectively providing an inlet port and an outlet port, juxtaposed main valve and pilot valve housing members clamped between said end members, successively arranged main valve and pilot valve members movably carried by said housing members and forming therewith a main valve chamber and a pilot valve chamber behind the respective main valve and pilot valve members, said end and housing members being formed with registering passages communicating said inlet port with said main valve chamber, communicating said main valve chamber with a vent via said pilot valve member, communicating said pilot valve chamber with said inlet port for continuous circulation of fluid under pressure through said pilot valve chamber, and communicating said pilot valve chamber, with a port adapted to be connected to a unit to which fluid under pressure is to be supplied through said valve assembly, said pilot valve member being moved to a position venting said main valve chamber upon reduction of fluid pressure in said pilot valve chamber below a predetermined value whereby said main valve member is moved to a position opening communication between said inlet and outlet ports under the predominating influence of the fluid under pressure in said inlet port as compared with that in the then vented main valve chamber.

13. A valve assembly comprising a valve casing providing inlet and outlet ports, a series of juxtaposed disc-like housing members clamped together, a diaphragm actuated main valve member having the diaphragm thereof clamped between successive housing members and forming therewith a main valve chamber in communication with said inlet port, a diaphragm-actuated pilot valve member having the diaphragm thereof clamped between successive housing members and forming therewith vented and pressure pilot valve chambers on opposite sides of the diaphragm thereof, said housing members being formed with a passage leading from said main valve chamber to said vented pilot valve chamber by way of said pilot valve member, said pilot valve member being operative upon predetermined decrease in fluid pressure in the pressure pilot valve chamber to vent said main valve chamber and thereby permit said main valve member to be moved to open communication between said inlet and outlet ports, and means for subdividing said vented pilot valve chamber so that substantially the entire pilot valve diaphragm area on that side is subjected to atmospheric pressure without variation due to venting of fluid pressure from said main valve chamber.

14. A valve assembly comprising a valve casing providing inlet and outlet ports, a series of juxtaposed disc-like housing members clamped together, a diaphragm-actuated main valve member having the diaphragm thereof clamped between successive housing members and forming therewith a main valve chamber in communication with said inlet port, a diaphragm-actuated pilot valve member having the diaphragm thereof clamped between successive housing members and forming therewith vented and pressure pilot valve chambers on opposite sides of the diaphragm thereof, said housing members being formed with a passage leading from said main valve chamber to said vented pilot valve chamber by way of said pilot valve member, said pilot valve member being operative upon predetermined decrease in fluid pressure in the pressure pilot valve chamber to vent said main valve chamber and thereby permit said main valve member to be moved to open communication between said inlet and outlet ports, said housing members and valve casing being additionally formed with a passage for continuous circulation of fluid from said inlet port through said pressure pilot valve chamber.

15. A valve assembly comprising a valve casing providing inlet and outlet ports, a series of juxtaposed disc-like housing members clamped together, a diaphragm-actuated main valve member having the diaphragm thereof clamped between successive housing members and forming therewith a main valve chamber in communication with said inlet port, a diaphragm-actuated pilot valve member having the diaphragm thereof clamped between successive housing members and forming therewith vented and pressure pilot valve chambers on opposite sides of the diaphragm thereof, said housing members being formed with a passage leading from said main valve chamber to said vented pilot valve chamber by way of said pilot valve member, said pilot valve member being operative upon predetermined decrease in fluid pressure in the pressure pilot valve chamber to vent said main valve chamber and thereby permit said main valve member to be moved to open communication between said inlet and outlet ports, said housing members and valve casing being additionally formed with a passage for continuous circulation of fluid from said inlet port through said pressure pilot valve chamber, and pressure relief means for maintaining in the last-mentioned passage a lower fluid pressure than in said inlet port.

16. In combination, an aircraft fuel tank provided with an air pressure supply port and with a plurality of sensing ports so located that in all positions of said tank at least one of said sensing ports is above the level of the fuel in said tank; a unitary valve assembly having air inlet, outlet, and sensing ports; and conduits connecting said inlet port to a source of air pressure supply, said outlet port to said air pressure supply port of said tank, and connecting together the respective sensing ports of said tank and said valve assembly; said valve assembly comprising a main valve member movable therein to open and to close communication between said inlet and outlet ports, and pilot valve members associated with the respective sensing ports thereof and operative upon the air pressure at the sensing port or ports of said tank which are then above the fuel level being below or above a predetermined value to respectively open and close said main valve member.

17. In combination, an aircraft fuel tank provided with an air pressure supply port and with a plurality of sensing ports so located that in all positions of said tank at least one of said sensing ports is above the level of the fuel in said tank; a unitary valve assembly having air inlet, outlet, and sensing ports; and conduits connecting said inlet port to a source of air pressure supply, said outlet port to said air pressure supply port of said tank, and connecting together the respective sensing ports of said tank and said valve assembly; said valve assembly comprising a series of clamped-together, juxtaposed main valve and pilot valve housing members, a main valve movably supported between successive housing members to open and to close communication between said inlet and outlet ports, and pilot valve members movably supported between successive housing members and associated with the respective sensing ports of said valve assembly, said pilot valve members being operative upon the air pressure at the sensing port or ports of said tank which are then above the fuel level being below or above a predetermined value to respectively open and close said main valve member.

References Cited in the file of this patent

UNITED STATES PATENTS

| | | |
|---|---|---|
| 1,600,322 | Davis | Sept. 21, 1926 |
| 2,148,383 | Tyden | Feb. 21, 1939 |
| 2,223,044 | Miller | Nov. 26, 1940 |
| 2,633,288 | Naab | Mar. 31, 1953 |
| 2,635,634 | Thurber | Apr. 21, 1953 |
| 2,711,754 | McKinney | June 28, 1955 |